United States Patent
Uematsu et al.

(10) Patent No.: US 7,299,713 B2
(45) Date of Patent: Nov. 27, 2007

(54) DEVICE FOR LAYING LINE ELEMENTS

(75) Inventors: Masaaki Uematsu, Koufu (JP);
Kuniyasu Matsumoto, Yamanashi (JP);
Hiroshi Nakagawa, Yamanashi (JP);
Masahiro Morioka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 586 days.

(21) Appl. No.: 10/786,172

(22) Filed: Feb. 26, 2004

(65) Prior Publication Data

US 2004/0179900 A1 Sep. 16, 2004

(30) Foreign Application Priority Data

Feb. 27, 2003 (JP) ............................. 2003-050939

(51) Int. Cl.
*B25J 19/00* (2006.01)
(52) U.S. Cl. .................... 74/490.02; 248/51; 901/50
(58) Field of Classification Search ............. 74/490.02; 248/51; 901/15, 28, 49, 50
See application file for complete search history.

(56) References Cited

U.S. PATENT DOCUMENTS

| 4,705,243 A | * | 11/1987 | Hartmann et al. ............ 248/51 |
| 5,065,062 A | | 11/1991 | Uehara et al. |
| 5,742,982 A | * | 4/1998 | Dodd et al. ................. 24/16 R |
| 2002/0066331 A1 | | 6/2002 | Okada et el. |

FOREIGN PATENT DOCUMENTS

| DE | 78 11 316 U1 | 1/1979 |
| EP | 1 163 984 A1 | 12/2001 |
| FR | 2 599 568 A1 | 12/1987 |
| JP | 5-116090 | 5/1993 |
| JP | 8-112796 | 5/1996 |
| JP | 8-197482 | 8/1996 |
| JP | 2647700 | 5/1997 |
| JP | 2553843 | 7/1997 |
| JP | 2597287 | 4/1999 |
| JP | 2001-353684 | 12/2001 |

OTHER PUBLICATIONS

Search Report for European Patent Application 04004439.8 mailed Jul. 19, 2005.

* cited by examiner

*Primary Examiner*—William C. Joyce
(74) *Attorney, Agent, or Firm*—Staas & Halsey LLP

(57) ABSTRACT

A device used to lay line elements such as electric and/or fluid lines between a stationary housing and a moving housing. The device includes a double pipe structure having an inner pipe member and an outer pipe member. The outer pipe member is attached to the moving housing and rotatably supported by the stationary housing. The inner and outer pipe members are arranged in a generally coaxial relationship and coupled to each other by a coupling member. The line elements, which extend between a holding portion on the stationary housing and a holding portion on the moving housing, are divided into first and second groups, and the first group of line elements is laid to extend through an inner hole of the inner pipe member while the second group of line elements is laid to extend through an annular gap formed between the inner and outer pipe members.

7 Claims, 6 Drawing Sheets

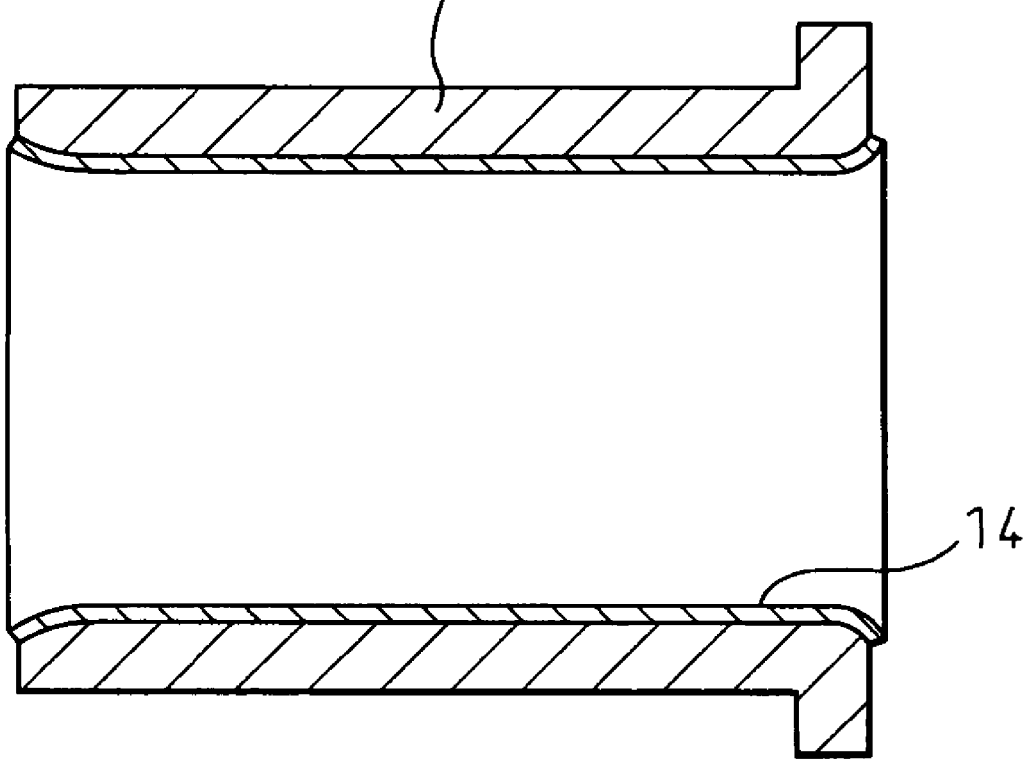

DEVICE FOR LAYING LINE ELEMENTS

BACKGROUND OF THE INVENTION

1. Field of the Invention

The present invention relates to a laying device for laying line elements in a machine having a first member and a second member rotatable relative to each other about a rotation axis thereof, which is applied to the circumference of those members. The laying device according to the present invention is typically used for electric and/or fluid supply lines in a wrist portion of an industrial robot.

2. Description of the Related Art

For example, a wrist portion of an industrial robot (referred to simply as a "robot" hereinafter) includes a structure provided with a first member and a second member rotatable in relation to each other about a rotation axis. Several prior arts are known for laying one or more electric/fluid lines in the circumference of such members rotatable in relation to each other. Typical examples are shown in FIGS. 1-3.

In a first prior art shown in FIGS. 1A and 1B, an outer member A and an inner member B are coaxially disposed so as to be rotatable in relation to each other about a common rotation axis, and a cable (or line element) W is laid to be turned in a U-shape within a annular cylindrical gap formed between the members A and B. More specifically, a stationary securing part C is provided on one member (the outer member A in this case) while a moving securing part D is provided on the other member (the inner member B in this case). The cable W is supported by the stationary securing part C and the moving securing part D and has enough length to extend between them with an U-shaped folded portion thereof formed within the annular gap.

In some cases, a CableTrack rack or a conduit can be used together with the above construction. The U-shaped folded portion can be formed by turning the cable circumferentially in a plane perpendicular to the common rotation axis as shown in FIG. 1A or by turning the cable parallel to the cylindrical surface of the inner member B as shown in FIG. 1B. These types of prior arts are described, for example, in Japanese Patent No. 2647700 and Japanese Utility Model Registration No. 2597287.

In a second prior art shown in FIG. 2, an outer member A and an inner member B are coaxially disposed so as to be rotatable in relation to each other about a common axis, and a cable W is laid to extend longitudinally generally parallel to the common axis. Further, a stationary securing part C is provided on one member (the outer member A in this case) while a moving securing part D is provided on the other member (the inner member B in this case). The cable W is supported by the stationary securing part C and the moving securing part D. The cable W may be bent near either or both of the stationary securing part C and the moving securing part D in generally a 2-shape, an S-shape, or a Z-shape. This type of prior arts is described, for example, in Japanese Patent Publication Nos. 2001-353684 and 08-197482 and Japanese Utility Model Registration No. 2553843.

In a third prior art shown in FIG. 3, an outer member A and an inner member B are coaxially disposed so as to be rotatable in relation to each other about a common rotation axis, and a cable W is laid to extend in a coiled form about the common rotation axis. Further, a stationary securing part C is provided on one member (the outer member A in this case) while a moving securing part D is provided on the other member (the inner member B in this case). This type of prior arts is described, for example, in Japanese Patent Publication Nos. 05-116090 and 08-112796.

However, the above prior arts involve the following problems (1)-(3).

(1) In the case of using the technique in which the cable W is laid so as to be turned in a U-shape (the first prior art), a large space for laying the cable, as a whole, is required to form a U-shaped turned portion with a sufficiently small curvature. In the case of a small gap between the outer member A and the inner member B, if this configuration is applied to the cable W, the U-shaped turned portion thereof will have a large curvature, which can bring about a large load on the cable W thereby to cause a problem of shortening the life of the cable W.

(2) In the case of using the technique in which the cable W is laid so as to extend longitudinally and generally parallel to the common axis and its ends are fixed (the second prior art), unless the cable W has a length enough to absorb its torsion, the torsion will shorten the life of the cable W. For example, in a robot, an arm portion thereof has a certain size and is easy to ensure a space long enough to absorb torsion of the cable W, while a wrist portion or the like thereof is too short to ensure an enough long liner space.

(3) In the case of using the technique in which the cable W is laid so as to extend in a coiled form (the third prior art), a smaller number of turns of the coiled cable leads to greater change in the diameter of the coiled cable during the relative rotation between the outer member A and the inner member B. This can cause a problem that a large radial space is required. A larger number of turns of the coiled cable also involve a long cable. Further, in the case that the cable W contains many lines (cores) or a thick electric or fluid line, it encounters a problem that it is difficult to form the cable W into a coiled shape.

SUMMARY OF THE INVENTION

Therefore, an object of the present invention is to provide a device for laying line elements, which can be easily applied to a portion having an outer member and an inner member rotatable in relation to each other, such as an articulating portion of a robot, especially a wrist portion, and which requires a small space for installation and can satisfy a requirement for a large range of relative movement (for example, 360 degrees or more) between the outer member and the inner member, in order to solve the above problems of the prior arts.

In order to achieve the object described above, the present invention is applied to a device for laying a plurality of line elements, containing at least one of an electric line and fluid line, between a first member and a second member rotatable in relation to each other about a rotation axis with one end of each line element held on the first member and the other end thereof held on the second member. Typically, the first and second members can be components constituting a portion of a robot body, such as components for use in a wrist portion of a robot.

In accordance with basic features of the present invention, a device for laying a plurality of line elements includes a double pipe structure having an inner pipe member and an outer pipe member having different diameters and a center axis, the inner and outer pipe members arranged in a generally coaxial relationship and coupled by a coupling member. This double pipe structure is adapted to be attached to the first member with the center axis thereof generally aligned with the rotation axis. The plurality of line elements is divided into first and second groups. The first group of line elements is laid to extend through an inner hole of the inner pipe member while the second group of line elements is laid to extend through an annular gap formed between the inner pipe member and the outer pipe member.

Thus, the line elements are prevented from needlessly moving freely within the pipe members by forming pipe members containing the line elements as a double pipe structure, dividing the line elements into first and second groups, and laying the first group of line elements so as to extend through the inner hole of the inner pipe member of the double pipe structure and the second group of line elements so as to extend through the annular gap formed between the inner and outer pipe members. This can prevent the line elements having a low torsion tolerance from moving toward the center of the pipes and thereby breaking early. Also, this can avoid unnatural abrasion of the line elements caused by line elements of large surface friction scraping on each other.

In the above-mentioned laying device, the second group of line elements may be adapted such that it is unwound on the inner pipe member when the first member is in a predetermined rotational position relative to the second member; and that, as viewed from the second member side, it is wound right-handed on the outer peripheral surface of the inner pipe member when the first member is rotated right-handed from the predetermined rotational position, and is wound left-handed on the outer peripheral surface of the inner pipe member when the first member is rotated left-handed from the predetermined rotational position.

Preferably, the second group of line elements has a smaller allowable bending radius than the first group of line elements. Preferably, a surface coating may be provided at least partially on the inner and outer peripheral surfaces of the inner pipe member as well as the inner peripheral surface of the outer pipe member which the line elements can contact, for the purpose of preventing the damage or abrasion of the line elements due to their friction. Alternatively, for the same purpose, a collar of a low friction material may be inserted at least partially along the inner and outer peripheral surfaces of the inner pipe member as well as the inner peripheral surface of the outer pipe member.

In the present application, a term "electric/fluid line" is used to refer to a line element containing at least one of the electric line and fluid line. Such a line element includes, for example, "a cable containing a plurality of electric lines and a plurality of fluid lines", "a cable containing a plurality of electric lines and a fluid line", "a cable containing only a plurality of electric lines" and "a cable containing only a plurality of fluid lines", etc.

BRIEF DESCRIPTION OF THE DRAWING

The above and other objects, features, and advantages of the present invention will be made more apparent from the following description of the preferred embodiments thereof with reference to the accompanying drawings, wherein:

FIG. 7 is a cross sectional view of another embodiment of the present invention using a collar of low friction material;

DESCRIPTION OF THE PREFERRED EMBODIMENTS

With reference to the drawings, several embodiments of the present invention will be described below.

Figure 1A:
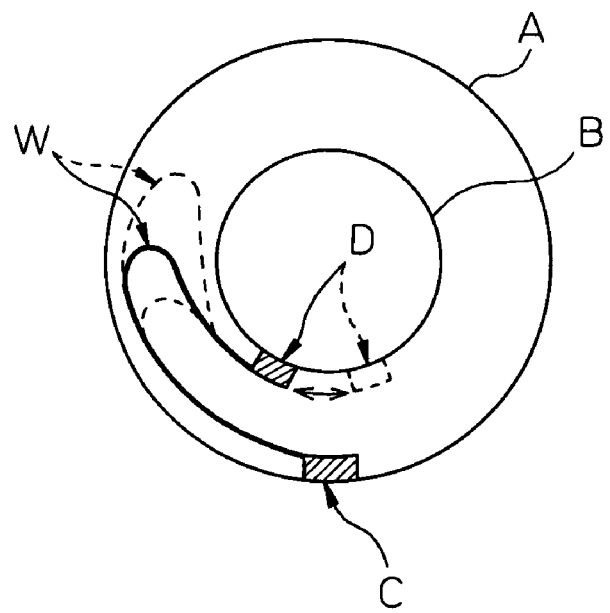
FIG. 1A is a diagrammatic view of a first prior art, illustrating a cable turned circumferentially in a plane perpendicular to a rotation axis.
Figure 1B:
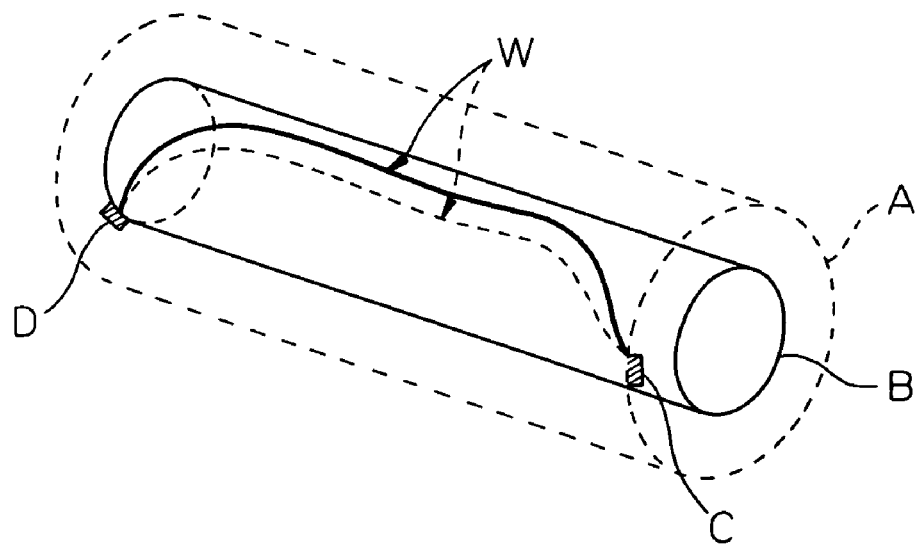
FIG. 1B is a diagrammatic view of the first prior art, illustrating a cable turned parallel to a cylindrical plane.
Figure 2:
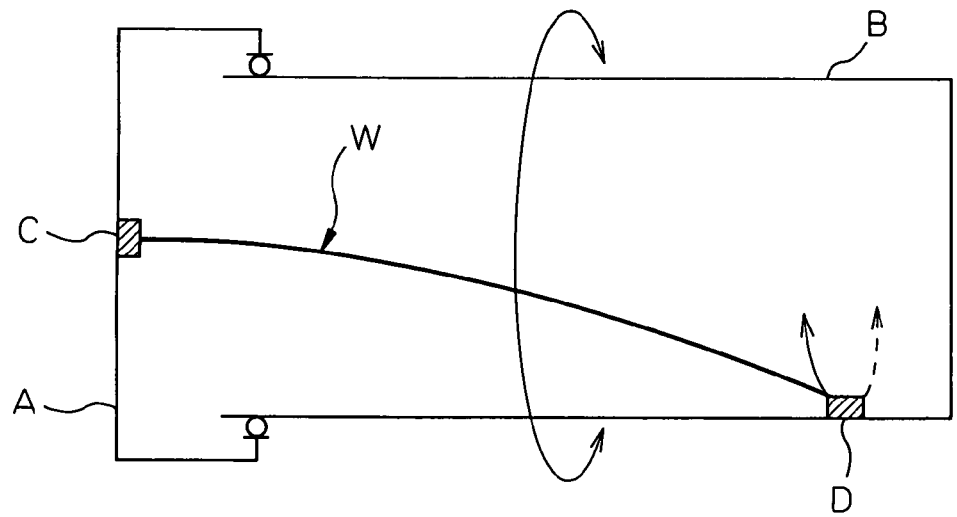
FIG. 2 is a diagrammatic view of a second prior art.
Figure 3:
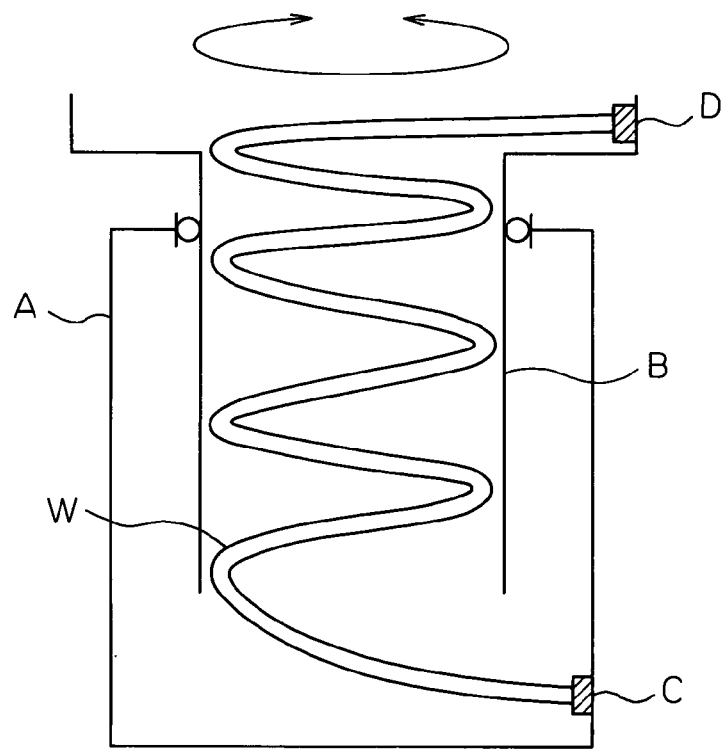
FIG. 3 is a diagrammatic view of a third prior art.
Figure 4:
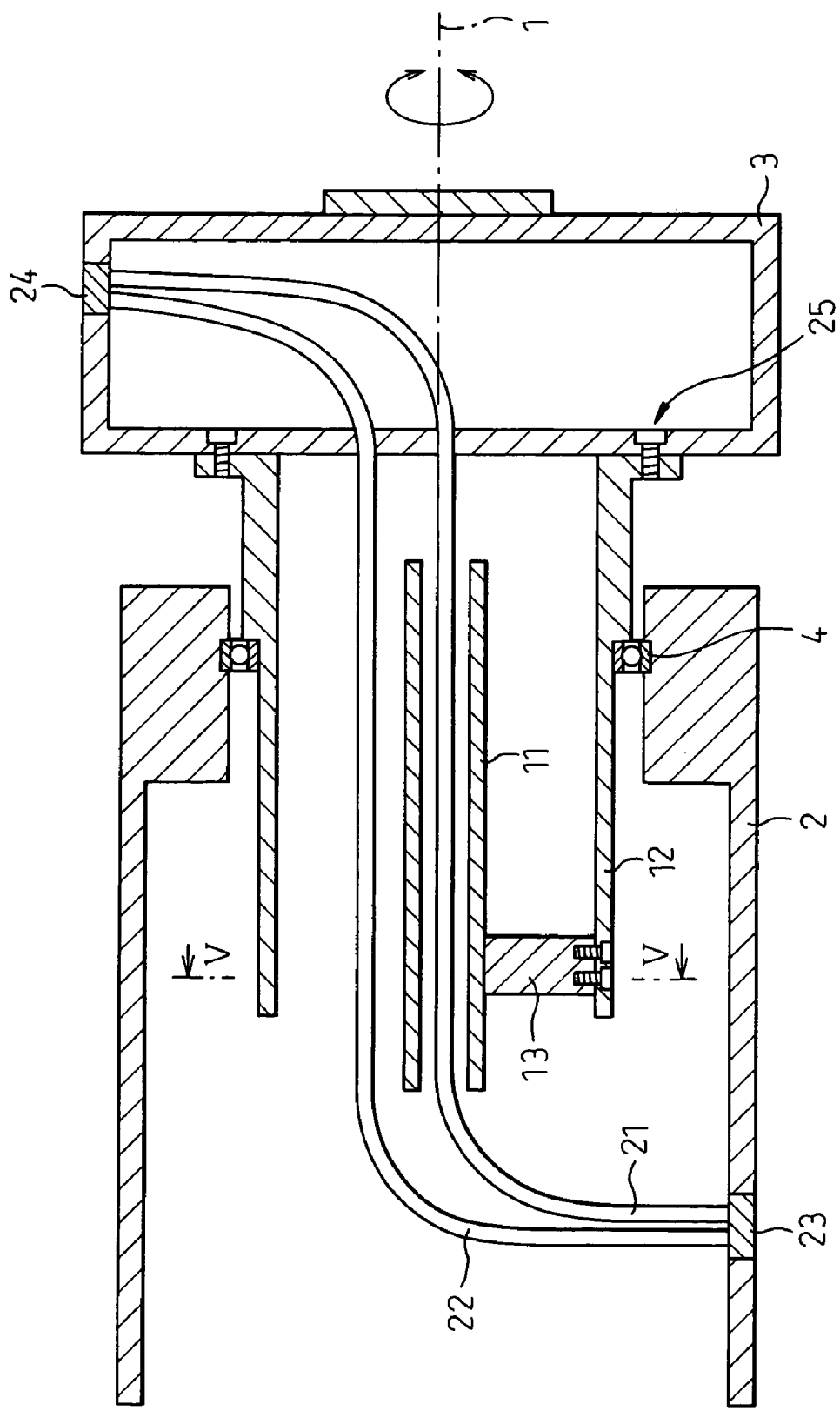
FIG. 4 is a longitudinal cross sectional view of a main portion of a laying device for laying line elements according to one embodiment of the present invention.
Figure 5:
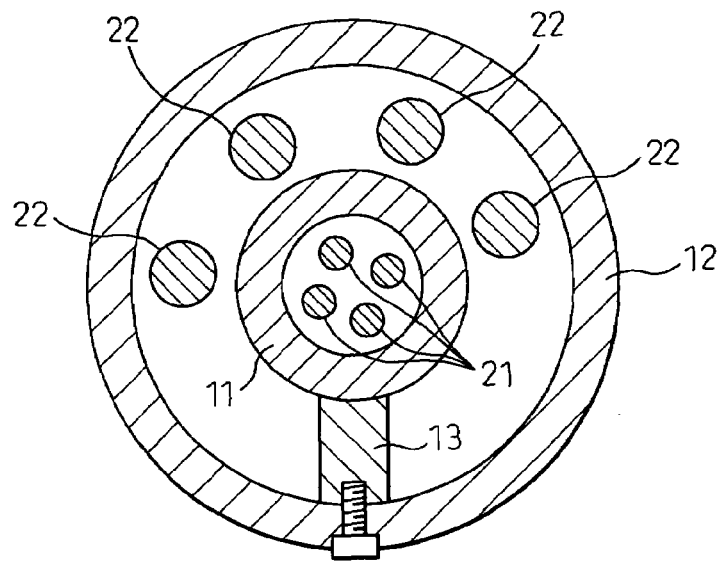
FIG. 5 is a cross sectional view taken along a line V-V of FIG. 4, illustrating arrangement of electric/fluid lines using a double pipe structure of the laying device shown in FIG. 4.

Firstly, FIGS. 4 and 5 are referred to. A structure shown in FIG. 4, which is used, for example, in a wrist portion of a robot, includes a hollow disk-like member (first member) constituting a moving housing 3, and a hollow cylindrical member (second member) constituting a stationary housing 2.

A pipe member 12 having a center axis 1 is attached to the moving housing 3 by fasteners 25 such as bolts and is rotatably supported in the cylindrical stationary housing 2 by means of bearings 4. Thus, the pipe member 12 and the moving housing 3 are supported by the stationary housing 2 so as to be rotatable about the center axis 1.

As shown in FIG. 5, another pipe member 11 is disposed inside the pipe member 12 in a generally coaxial relationship with the pipe member 12, and these pipe members 11 and 12 are coupled at parts thereof to each other by means of a coupling member 13. In other words, the inner pipe member 11 and the outer pipe member 12 are coupled to each other in a generally coaxial relationship to form a double pipe structure. The double pipe structure formed by the inner pipe member 11 and the outer pipe member being integrated with each other is supported in the stationary housing 2 by the above-mentioned support mechanism so as to be rotatable about the rotation axis 1.

The electric/fluid lines extend from a holding portion 23 disposed on the stationary housing 2 to a holding portion 24 disposed on the moving housing 3 through the double pipe structure. The electric/fluid lines referenced by reference numeral "21" present a first group of line elements extending through the inner hole (hollow portion) of the inner pipe member 11 of the double pipe structure, as shown in FIG. 5. On the other hand, the electric/fluid lines referenced by reference numeral "22" present a second group of line elements extending through the space (annular gap having a portion thereof occluded by the coupling member 13) formed between the inner pipe member 11 and the outer pipe member 12 of the double pipe structure, as shown in FIG. 5. It should be understood that the term "group" used herein means one or more line elements.

Figure 8A:
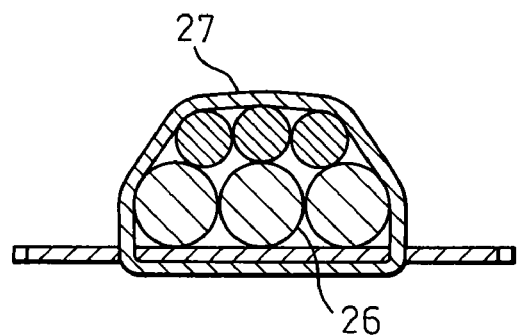
FIG. 8A is a diagrammatic view of one embodiment of a holding portion for holding electric/fluid line to another member illustrating the electric/fluid lines held by a binding band.
Figure 8B:
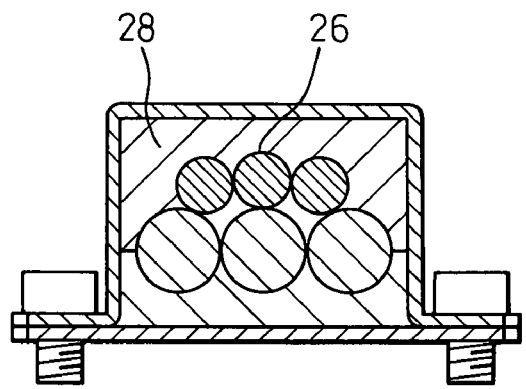
FIG. 8B is a diagrammatic view of another embodiment of a holding portion for holding electric/fluid line to another member illustrating the electric/fluid lines held by a fixing member.
Figure 9:
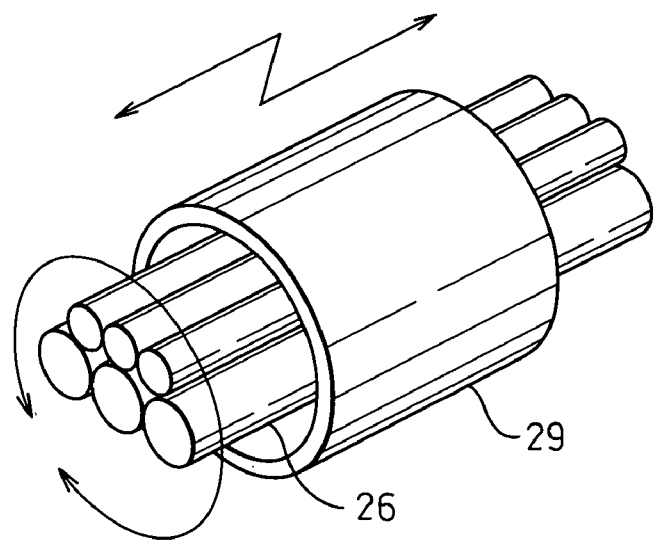
FIG. 9 is a diagrammatic view of another embodiment of a holding portion for holding electric/fluid line to another member illustrating the electric/fluid lines restricted by a restricting member.

One end of each electric/fluid line 21, 22 is held on the stationary housing 2 by the holding portion 23, and the other ends thereof are held on the moving housing 3 by the holding portion 24. The holding portions 23, 24 may have a construction in which electric/fluid lines 26 (corresponding to the electric/fluid lines 21, 22) are held by a binding band 27 or securing member 28 for restricting movement of the electric/fluid lines, as shown in FIGS. 8A and 8B, or may have a constitution in which the electric/fluid lines 26 are restrained by a restraining member 29 so as to be slidable longitudinally and/or rotatable about a longitudinal axis thereof, as shown in FIG. 9. The electric/fluid lines 21, 22 extend so that each line element has an appropriate amount of slack (extra length) to allow for the rotation of the moving housing 3 described below. The behavior of the electric/fluid lines 21, 22 during the rotation of the moving housing 3 is diagrammatically shown in FIGS. 6A-6C.

Figure 6A:
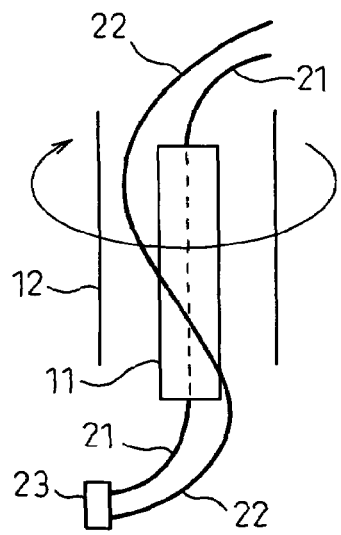
FIGS. 6A-6C are diagrammatic views of arrangement of electric/fluid lines in accordance with the embodiment of the present invention, illustrating the line elements when the double pipe structure is rotated right-handed, the line elements when the double pipe structure is in a neutral position (zero rotation) and the line elements when the double pipe structure is rotated left-handed, respectively.
Figure 6B:
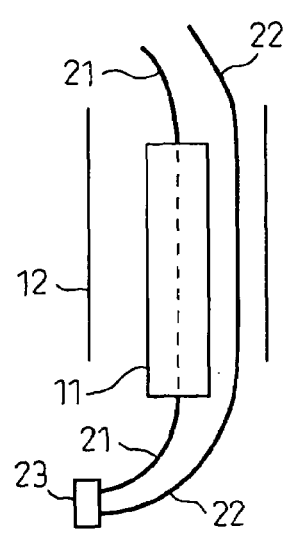
Figure 6C:
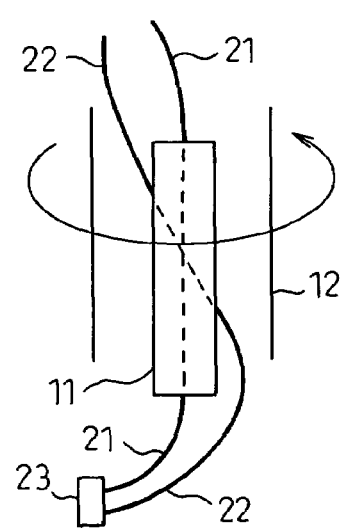

In FIGS. 6A-6C, the first group of line elements is generally referenced by reference numeral "21" and the second group of line elements is generally referenced by reference numeral "22". In a neutral position with regard to rotation (zero rotation) shown in FIG. 6B, the first inner group of line elements 21 extends from the holding portion 23 on the stationary housing 2, through the inner hole of the inner pipe member 11 in generally straight, and to the holding portion 24 on the moving housing 3 (not shown in FIGS. 6A-6C). The second outer group of line elements 22 extends from the holding portion 23 on the stationary housing 2, through the annular gap between the inner pipe member 11 and the outer pipe member 12 in generally straight, and to the holding portion 24 on the moving housing 3 (not shown in FIGS. 6A-6C). It should be note that the electric/fluid lines 21, 22 in neutral position have an appropriate amount of slack to allow for the rotation of the moving housing 3, as described above.

As viewed from the right side (moving housing side) along the rotation axis in FIG. 4, when the moving housing 3 is rotated clockwise (right handed), the second outer group of line elements 22 is wound right-handed on the inner pipe member 11 as shown in FIG. 6A. Similarly, as viewed from the right side (moving housing side) along the rotation axis in FIG. 4, when the moving housing 3 is rotated counter-clockwise (left-handed), the second outer group of line elements 22 is wound left-handed on the inner pipe member 11 as shown in FIG. 6C. Although the first inner group of line elements 21 at this time slightly changes the position where it passes through the inner pipe member while the holding portion 24 on the moving housing 3 is moving, the amount of position change is small. However, as the first inner group of line elements 21 can bring about a larger torsion than the second outer group of line elements 22 along with movement of the holding portion 24, it is preferable that a line element having a low torsion tolerance belongs to the second group.

When the line elements, especially the second group of line elements 22, have a sufficient amount of slack, a sufficiently wide range of axial rotation (for example, plus or minus about 360 degree) can be reasonably achieved. However, it should be noted that if an amount of slack of the line elements is increased too much in order to widen the range of axial rotation, the line elements may contact and catch the edge or outer surface of the inner pipe member 11 or the inner surface of the outer pipe member 12, etc., thereby bringing about a problem in restricting the movement thereof. It also should be noted that even if it is possible to move the inner and outer pipe members 11, 12, too much slack in the line elements could rapidly cause abrasion in the contacting area thereby to shorten a life of the electric/fluid lines.

Such a situation can be avoided, for example, by attaching, to the pipe member 11 or 12, a collar 14 made of material having a low friction coefficient, as shown in FIG. 7. Alternatively, it can be avoided by providing a nonabrasive surface coating on the inner and outer peripheral surfaces of the inner pipe member 11, the inner peripheral surface of the outer pipe member 12 and/or other portions. Such a low friction coefficient material and such a nonabrasive surface coating, which includes various types, are well-known and therefore, not described herein in detail.

In accordance with the present invention, when laying a plurality of line elements (electric/fluid lines) such as tubes and/or cables, they are divided into two groups. Preferably, the second group of line elements 22 has a smaller allowable bending radius than the first group of line elements 21. For example, it is preferable that electric/fluid lines having a larger allowable bending radius (i.e., relatively rigid and difficult to bend) are laid to extend through the inner hole of the inner pipe member 11 and that the electric/fluid lines having a smaller allowable bending radius (i.e., relatively flexible and easy to bend) are laid to extend through the annular gap between the inner pipe member 11 and the outer pipe member 12. Further, a type of electric/fluid lines having a high torsion tolerance may be laid to extend through the inner hole of the inner pipe member while a type of electric/fluid lines having a low torsion tolerance may be laid to extend through the annular gap.

Preferably, the groups are also determined such that the life of each line element is as long as possible. Generally, as the second outer group of line elements partially wind on the inner pipe member 11 and are thereby subject to bending in addition to torsion, they should have a longer life than those subject to only torsion.

As described above, the present invention can protect electric/fluid lines, which are arranged in the circumference of two members (such as a wrist portion of a robot) rotatable in relation to each other about a rotation axis, from fatigue due to bending and/or torsion, thereby to increase their life. This allows a user to utilize the electric/fluid lines for longer with no replacement and can achieve an effect to save cost for spare parts and maintenance.

While the invention has been described with reference to specific embodiments chosen for purpose of illustration not of limitation, it should be apparent that numerous modifications or variation could be made thereto by those skilled in the art without departing from the basic concept and scope of the invention as claimed in the accompanying claims.

What is claimed is:

1. A device for laying a plurality of line elements between a first member and a second member rotatable in relation to each other about a rotation axis, said line elements containing at least one of electric and fluid lines, one end of each line element held on said first member by a holding member and the other end thereof held on said second member by a holding member, said device comprising:

a double pipe structure having an inner pipe member and an outer pipe member having different diameters and a center axis, said inner and outer pipe members arranged in a generally coaxial relationship to each other and coupled to each other by a coupling member, said double pipe structure adapted to be attached to the first member with the center axis thereof generally aligning with the rotation axis; and said plurality of line elements divided into first and second groups, said first group of line elements being laid to extend through an inner hole of said inner pipe member and said second group of line elements being laid to extend through an annular gap formed between said inner pipe member and said outer pipe member, wherein said second group of line elements is unwound on said inner pipe member when said first member is in a predetermined rotational position relative to said second member; and wherein, as viewed from said second member, said second group of line elements is wound right-handed on the outer peripheral surface of said inner pipe member when said first member is rotated right-handed from the predetermined rotational position, and is wound left-handed on the outer peripheral surface of said inner pipe member when said first member is rotated left-handed from the predetermined rotational position.

2. The device according to claim 1, wherein said second group of line elements has a smaller allowable bending radius than said first group of line elements.

3. The device according to claim 2, wherein a surface coating is provided for preventing abrasion at least partially on the inner and outer peripheral surfaces of said inner pipe member as well as the inner peripheral surface of said outer pipe member which said line element can contact.

4. The device according to claim 2, wherein a collar of a low friction material is inserted at least partially along the inner and outer peripheral surfaces of said inner pipe member as well as said inner peripheral surface of said outer pipe member.

5. The device according to claim 1, wherein a surface coating is provided for preventing abrasion at least partially on the inner and outer peripheral surfaces of said inner pipe member as well as the inner peripheral surface of said outer pipe member which said line element can contact.

6. The device according to claim 1, wherein a collar of a low friction material is inserted at least partially along the inner and outer peripheral surfaces of said inner pipe member as well as said inner peripheral surface of said outer pipe member.

7. The device according to claim 1, wherein said first and second members comprise components constituting a portion of a robot body.

* * * * *